United States Patent [19]

Chee et al.

[11] Patent Number: 5,046,184
[45] Date of Patent: Sep. 3, 1991

[54] METHOD AND APPARATUS FOR PASSIVE MODE LOCKING HIGH POWER LASERS

[75] Inventors: Joseph K. Chee, Los Angeles; Eric C. T. Cheung, San Francisco; Mo-Nga Kong; Jia-Ming Liu, both of Los Angeles, all of Calif.

[73] Assignee: University of California, Los Angeles, Calif.

[21] Appl. No.: 505,709

[22] Filed: Apr. 5, 1990

[51] Int. Cl.$^5$ .............................................. H01S 3/098
[52] U.S. Cl. ......................................... 372/18; 372/6; 372/21; 372/97; 372/98
[58] Field of Search .................... 372/6, 97, 98, 99, 21, 372/18; 350/401, 403

[56] References Cited

U.S. PATENT DOCUMENTS

| | | | |
|---|---|---|---|
| 4,116,542 | 9/1978 | Moncur et al. | 350/403 X |
| 4,124,278 | 11/1978 | Grinberg et al. | 350/403 X |
| 4,145,607 | 3/1979 | Bates | 250/199 |
| 4,176,327 | 11/1979 | Wayne et al. | 372/18 |
| 4,835,778 | 5/1989 | Kafka et al. | 372/6 |
| 4,853,933 | 8/1989 | Blow et al. | 372/18 |
| 4,864,577 | 9/1989 | Aoshima et al. | 372/18 |
| 4,955,027 | 9/1990 | Piper et al. | 372/18 |

OTHER PUBLICATIONS

"Laser Mode Locking with Addition of Non-Linear Index" by H. and Y. Silberg in *IEEE Journal of Quantum Electronics*, vol. QE-22, No. 2, 325 (1986).

"Parameter Ranges for CW Passive Mode Locking," by H. Haus in *IEEE Journal of Quantum Electronics*, vol. QE-12, No. 3, 169 (1976).

"Spectral and Temporal Characterizations of Coupled-Cavity Mode Locking in a KC1:T1 Color Center Laser," X. Zhu, P. Kean, and W. Sibbett; *IEEE Journal of Quantum Electronics*, vol. 25, No. 12, Dec., 2445-2453 (1989).

(List continued on next page.)

Primary Examiner—William L. Sikes
Assistant Examiner—Galen J. Hansen
Attorney, Agent, or Firm—Poms, Smith, Lande & Rose

[57] ABSTRACT

A passively mode-locked laser suitable for use with homogeneously broadened lasing medium or a lasing medium having a high-power output, long relaxation time or a narrow bandwidth. The laser includes a main cavity in which the lasing medium is disposed and an external cavity including a non-linear element. The non-linear element is selected to induce a non-linear phase shift in a coherent beam from the main cavity. In operation, a portion of a laser beam in the main cavity is coupled to the external cavity and a phase-shifted output from the external cavity is reflected back into the main cavity to provide a narrow pulse, mode-locked output from the laser. In one embodiment the non-linear element of the external cavity is an optical fiber with a mirror disposed adjacent one end of the optical fiber to provide dual propagation of a laser pulse through the fiber. In high-power applications the external cavity mirror is disposed proximate but spaced apart from the optical fiber end. The ends of the optical fiber are treated to avoid multiple reflections and Q-switching in lasing media having long relaxation times. In one embodiment the optical fiber ends form surfaces non-perpendicular to the laser beam path. Coupling between the main and external cavity may be provided by a beam splitter disposed either externally or within the main cavity. The beam splitter may also have a reflectance depending upon the polarization orientation of an incident beam. The percentage of a laser beam from the main cavity coupled into the external cavity may then be varied by the addition of a quarter-wave plate to allow changes in the polarization orientation of the beam incident on the beam splitter.

15 Claims, 2 Drawing Sheets

OTHER PUBLICATIONS

"Mode Locking by a Frequency-Doubling Crystal: Generation of Transform-Limited Ultrashort Light Pulses," K. Stankov, *OPTICS LETTERS*, vol. 14, No. 7, 359-361 (1989).

"Femtosecond Pulse Generation in a Laser with a Nonlinear External Resonator," J. Mark, L. Y. Liu, K. L. Hall, H. A. Haus, and E. P. Ippen; *OPTICS LETTERS*, vol. 14, No. 1, 48-50 (1989).

"Enhanced Mode Locking of Color-Center Lasers, " P. N. Kean, X. Zhu, D. W. Crust, R. S. Grant, N. Langford, and W. Sibbett, *OPTICS LETTERS*, vol. 14, No. 1, Jan. 1, 39-41 (1989).

"Femtosecond Passively Mode-Locked Ti:$Al_2O_3$ Laser with a Nonlinear External Cavity," J. Goodberlet, J. Wang, and J. G. Fujimoto; *OPTICS LETTERS*, vol. 14, No. 20, Oct. 15, 1125-1127 (1989).

"Femtosecond Pulse Generation from a Titanium-Doped Sapphire Laser using Nonlinear External Cavity Feedback," P. M. W. French, J. A. R. Williams, and J. R. Taylor; *OPTICS LETTERS*, vol. 14, No. 13, Jul. 1, 686-688 (1989).

"Additive-Pulse Mode-Locked NaCl:OH Laser," C. P. Yakymyshyn, J. F. Pinto, and C. R. Pollock, *OPTICS LETTERS, vol. 14, No. 12, 621-623 (1989).*

"Methods of Passive and Active Mode Locking Using Intracavity Optical Frequency Mixing,"K. Stankov, *OPTICS LETTERS*, vol. 13, No. 1, 51-53 (1989).

"Improved Mode Locking of an F-Center Laser with a Nonlinear Nonsoliton External Cavity,"K. J. Blow and B. P. Nelson, *OPTICS LETTERS*, vol. 13, No. 11, 1026-1028 (1988).

"Additive Pulse Mode Locking,"E. P. Ippen, H. A. Haus, and L. Y. Liu; *Journal of the Optical Society of America B*, vol. 6, No. 9, 1736-1745 (1989).

"Ultrashort Pulse Reshaping with a Nonlinear Fabry-Perot Cavity Matched to a Train of Short Pulses," F. Ouellette and M. Pice, *Journal of the Optical Society of America B*, vol. 5, No. 6, 1228-1236 (1988).

"Mode Locked Lasers with Nonlinear External Cavities," K. J. Blow and D. Wood; *Journal of the Optical Society of America B*, vol. 5, No. 3, 629-632 (1988).

"Soliton Laser I: A Simplified Model," P. A. Belanger, *Journal of the Optical Society of America B*, vol. 5, No. 4, 793-798 (1988).

"Stabilizing the Soliton Laser," F. M. Mitscheke and L. F. Mollenauer, *IEEE Journal of Quantum Electronics*, QE-22, 2242-2250 (1986).

"The Soliton Laser," L. F. Mollenauer & R. H. Stolen, *OPTICS LETTERS*, vol. 9, No. 1, 13-15 (1984).

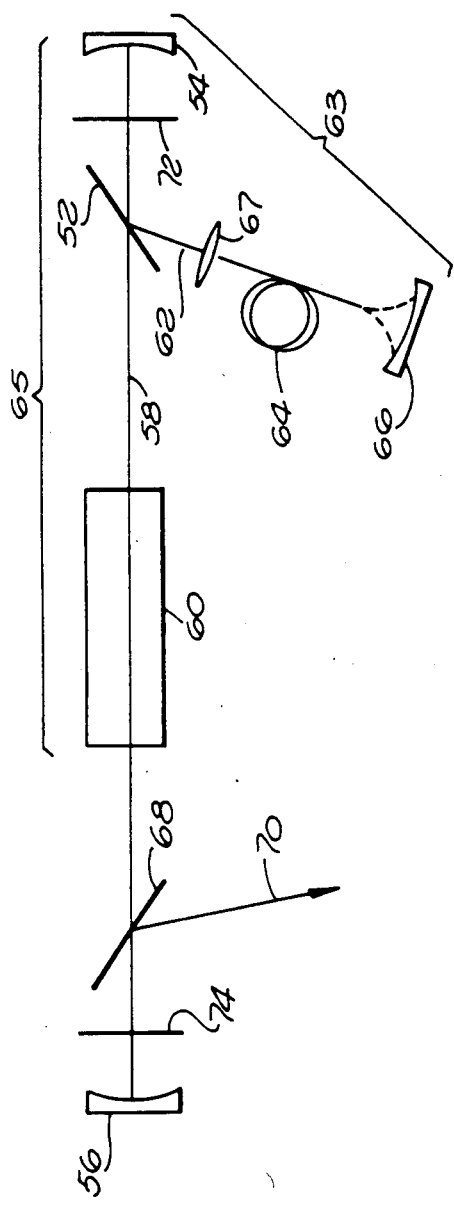
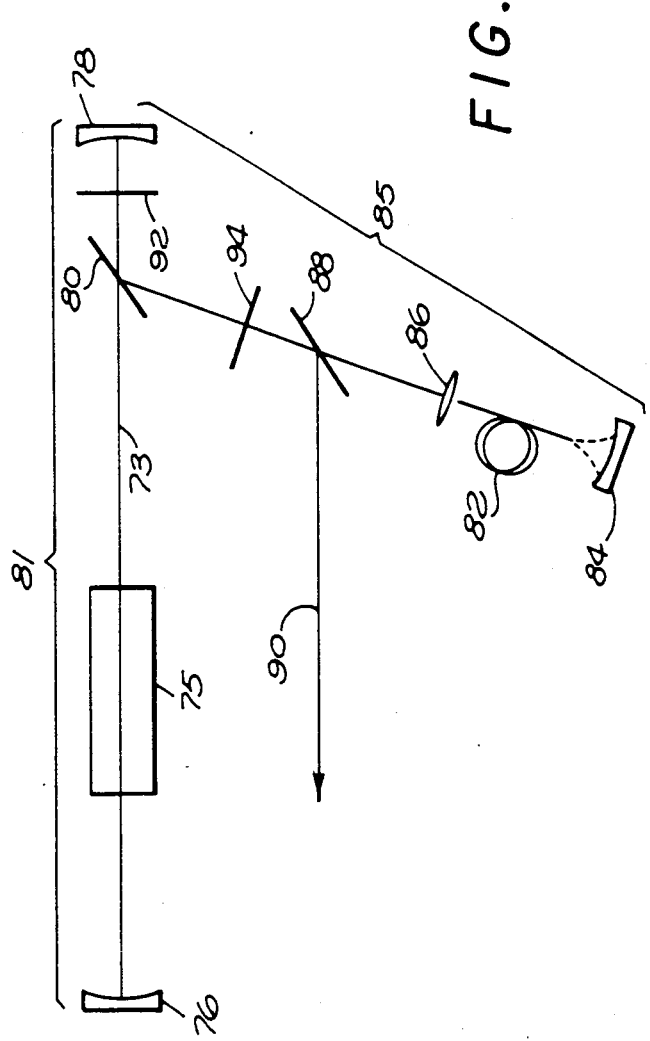

METHOD AND APPARATUS FOR PASSIVE MODE LOCKING HIGH POWER LASERS

FIELD OF THE INVENTION

The present invention relates to laser devices and, more particularly, passively mode-locked lasers.

DESCRIPTION OF THE PRIOR ART

In a variety of applications, it is highly desirable to obtain a mode-locked output from a laser. Mode-locked Nd:YAG lasers, for example, are widely used as a coherent pumping source for a wide variety of optically pumped lasers.

Mode-locking is achieved by maintaining a fixed phase relationship among the longitudinal modes of the main cavity of the laser. The superposition of these modes results in a train of pulses separated by one round-trip time of the cavity. Mode-locking is normally achieved by periodically varying the net gain of the laser cavity in some fashion. Typically, an optical element is added to the main cavity of the laser between one of the cavity mirrors and the lasing medium. The loss introduced by this optical element varies so that the optical element acts as a shutter, periodically opening for a brief period of time. The period between shutter openings is selected to be approximately equal to the round trip travel time of a light pulse within the laser cavity. A transient spike circulating inside the laser cavity in synchronization with these shutter openings is unaffected by the presence of the shutter. The result is a preferential amplification of this spike, resulting in the development of a train of mode-locked pulses.

Mode-locking can be either active or passive. Active mode-locking typically requires an external signal to modulate the gain or loss of the optical element added to the laser main cavity. Passive mode-locking is generally achieved by employing an optical element having a transmission coefficient that is dependent upon the intensity of an incident beam. Optical elements such as, for example, saturable absorbers are typically employed for passive mode-locking. Saturable absorbers usually have a light transmission coefficient that increases precipitously when the power of the incident light beam is high enough to "saturate" the absorber. Passive mode-locking is often preferable to active mode-locking. Typically, active mode-locking devices are very expensive, and may represent a significant fraction of the cost of a laser. Passive mode-locking also typically provides advantageously shorter pulse widths.

Lasers can either be continuously (CW) mode-locked or Q-switch mode-locked. It has previously been believed that continuous passive mode-locking was generally limited to lasers using a lasing medium having broad gain bandwidths or short relaxation times. This was thought of as an inherent limitation in the physical mechanics through which passive mode-locking is achieved. Saturable absorbers, for example, are generally unsuitable for CW mode-locked lasers employing a lasing medium with a long relaxation time such as Nd:YLF and Nd:YAG. This limitation is illustrated in an article entitled "Parameter Ranges for CW Passive Mode-locking," by H. A. Haus in IEEE J. Quantum Electronics, Vol. 77-12, No. 3, 169 (1976). Neodymium lasers typically have useful continuous wave power outputs in the tens of watts. Actively mode-locked neodymium lasers are used in a variety of applications and are commonly employed as a pump source for other types of optically-pumped lasers.

With some types of lasers employing a lasing medium having a broad gain bandwidth, it has been possible to shorten the pulse width obtained through actively mode-locking or synchronously pumping the laser. This pulse shortening has been achieved by coupling the laser to an external cavity that includes a passive optical element which induces a non-linear phase shift in a laser pulse transmitted through it. In operation, a transmitted portion of an output pulse from an appropriate type of actively mode-locked or synchronously pumped laser is directed to the external cavity and reflected back into the main cavity of the laser coincident with the return of an internally reflected portion of the same pulse. This type of pulse narrowing is illustrated in an article entitled "The Soliton Laser," by L. Mollenauer and R. Stolen in Optics Letters, Vol. 9, No. 1 (1984). In one instance, this external cavity approach has been extended to achieve passive mode-locking in a laser employing titanium sapphire (Ti:Al$_2$O$_3$), as the lasing medium. This type of passive mode-locking is discussed in an article entitled "Femtosecond Passively Mode-Locked Ti:Al$_2$O$_3$ Laser With A Nonlinear External Cavity," by J. Goodberlet, et al., in Optics Letters, Vol. 14, No. 20 (1989). The titanium sapphire lasing material, however, normally has a broad gain bandwidth. Additionally, the phase shift induced in a laser pulse by the passive non-linear elements typically employed for pulse shortening is usually dependent on the intensity of the laser pulse. Thus, for example, passive mode-locking using non-linear elements has previously been achieved only at power levels below 300 milliwatts, as illustrated in the above-referenced article by Goodberlet, et al.

Since active mode-locking of neodymium lasers is expensive, and since passive mode-locking typically provides an output beam having much shorter pulses, there still exists a need for passive mode-locking of lasers characterized by high output power levels, long relaxation times, or narrow gain bandwidths, such as the neodymium lasers. The present invention satisfies this need.

SUMMARY OF THE INVENTION

In general terms the present invention provides a CW passively mode-locked high-power laser that cannot be passively mode-locked by conventional techniques. The present invention is also suitable for use in connection with laser media having too long a fluorescence relaxation time or too narrow a gain bandwidth for use with conventional passive mode-locking techniques. More particularly, a first preferred embodiment of the present invention includes a main cavity optically coupled to an external cavity having a passive, non-linear optical element to induce a non-linear phase shift in the pulses propagating through it. In applications where neodymium doped materials, such as Nd:YLF and Nd:YAG, are employed as the lasing media, the non-linear optical element may be an optical fiber. The external cavity also includes a return mirror disposed adjacent one end of the non-linear optical element so as to reflect a laser pulse emerging from the non-linear element back through the non-linear element along a reciprocal path to the incident pulse. The laser of the present invention thus provides a continuous train of pulses and is passively mode-locked, even in high power applications of several watts. In the above-described embodiment, the return mirror is configured as a retro-reflector.

In an alternative embodiment the non-linear optical element is optically coupled to the resonant cavity by a beam splitter disposed within the main cavity of the laser. The percentage of the laser beam coupled into the non-linear optical element can then be varied in order to alter the width of mode-locked pulses from the laser. In this embodiment, the beam splitter is selected so that its reflectance is dependent upon the polarization orientation of an incident beam. A quarter-wave plate is also added to allow changes in polarization orientation of the laser beam incident to the beam splitter.

The output power of the laser may also be varied by including another polarization orientation-dependent beam splitter and quarter-wave plate pair within the laser main cavity. Rotation of the second quarter-wave plate will then vary the output coupling of the laser. This second beam splitter and quarter-wave plate pair may either be disposed along the optical axis of the main cavity or positioned between the non-linear optical element and the first beam splitter and quarter-wave plate pair coupling the main and external cavities of the laser.

The novel features of the present invention will be better understood from the following detailed description, considered in connection with the accompanying drawings. It should be understood, however, that the drawings are for purposes of illustration and description only and are not intended as a definition of the limits of the present invention.

BRIEF DESCRIPTION OF THE DRAWINGS

FIG. 4 illustrates another embodiment of the present invention.

FIG. 5 illustrates yet another preferred embodiment of the present invention.

DETAILED DESCRIPTION OF THE PREFERRED EMBODIMENTS

Figure 1:
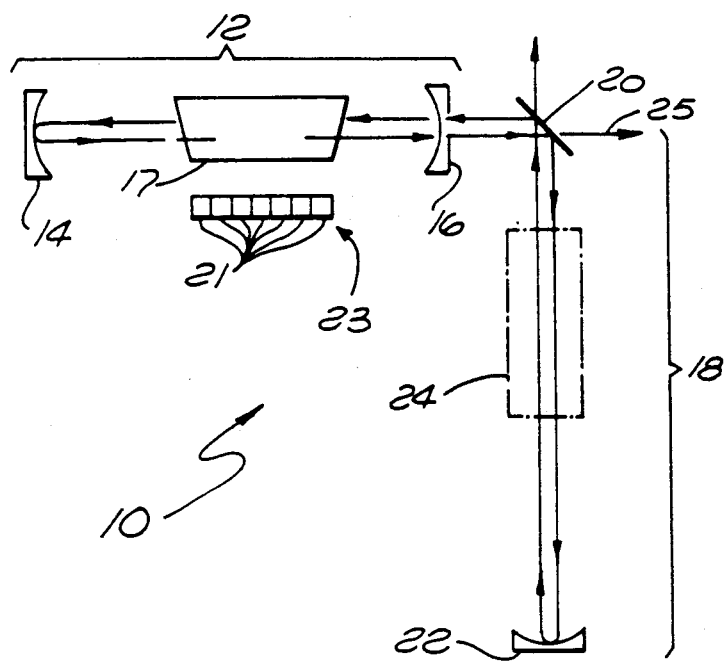
FIG. 1 is a schematic view of one preferred embodiment of the present invention.

Referring to the Figures, and more particularly FIG. 1, there is shown one preferred embodiment of the present inventive passively mode-locked laser 10. As illustrated, the laser 10 includes a main cavity 12, including a mirror 14 an output coupler 16 and a lasing medium 17, and a passive external cavity 18 defined by the output coupler 16 and a return mirror 22. This external cavity 18 also includes a beam splitter 20 and a non-linear optical element 24 selected to create a phase shift in laser pulses from the main cavity. The lasing medium 17 can either be excited by a flash lamp operating continuously or any other appropriate light source such as, for example, one or more laser diodes arranged in an array oriented with respect to the lasing medium 17 so as to excite the medium 17.

When a pulse from the lasing medium 17 reaches the output coupler 16, a fraction of the pulse is reflected back toward the lasing medium 17 while the remainder of the same pulse is transmitted through the output coupler 16. The fraction of the pulse transmitted through the output coupler 16 is then partially reflected off of the beam splitter 20 so as to pass once through the non-linear element 24, reflect off of the mirror 22, and return a second time through the non-linear element 24. This fraction of the pulse is again partially reflected off of the beam splitter 20 so as to return to the output coupler 16. During the same time period, the fraction of the original pulse reflected back by the output coupler 16 travels through the lasing medium 17, reflects off of the mirror 14, and passes back through the lasing medium 17 to return to the output coupler 16. The lengths of the main cavity 12 and the external cavity 18 are intentionally selected so that the round trip transit time of both the reflected and transmitted fractions of the original laser pulse are approximately the same. Thus, the reflected and transmitted fractions of the original pulse return to the output coupler 16 at the same time. When the reflected and transmitted fractions of the original laser pulse return to the output coupler 16, constructive and destructive interferometric recombinations occur at different times along the temporal extent of the pulse, resulting in a narrower laser pulse that is injected back into the main cavity 12. This narrower pulse in turn passes through the lasing medium 17, is reflected by the mirror 14 and propagates back through the lasing medium 17 to return to the output coupler 16 and repeat the above-described process of being partially reflected and transmitted through the output coupler 16. This entire process continues until naturally occurring line-broadening phenomena within the main cavity 12 preclude further narrowing of the laser pulses. The final mode-locked and pulsed output from the laser is then derived from the fraction of each laser pulse exiting the output coupler 16 that is partially transmitted through the beam splitter 20 to propagate along the axis 25 instead of being partially reflected off of the beam splitter 20 into the external cavity 18.

The inventors have determined that it is possible with this approach to obtain an interferometric recombination between the transmitted fraction of a laser pulse having a non-linear phase shift and a reflected fraction of the same pulse, so as to obtain a narrower width pulse that can be preferentially generated in the main cavity along with mode-locking. This approach has also been found by the inventors to be suitable for use in lasing medium 17 typically having long relaxation times and narrow gain bandwidths. The inventors have also identified a non-linear optical element suitable for inducing an appropriate phase shift in laser pulses of several watts of average power. The inventors have also determined that this approach can be employed with either pulsed or continuous stimulation of the lasing medium. Reinjection of a non-linearly phase shifted light pulse back into the main cavity 12 along with interferometric recombination between a non-linearly phase shifted fraction of light pulse returning to the external cavity 12 with a non-phase-shifted fraction of the same light pulse exiting from the main cavity 12 enhances interaction between the longitudinal modes of the main cavity so as to lock in phase substantially all of the modes within the laser-gain profile.

Figure 2:
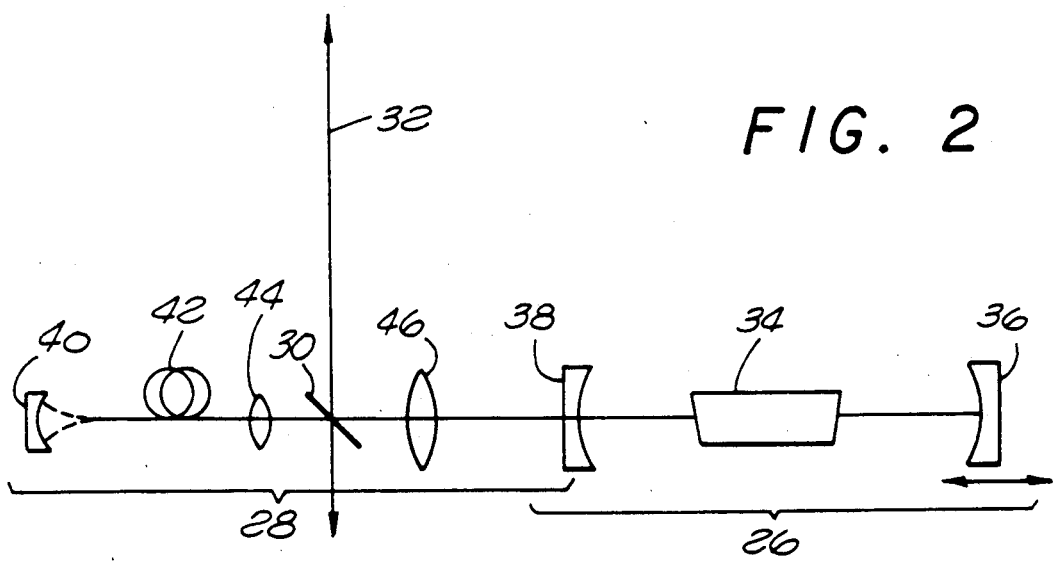
FIG. 2 illustrates a diagram of a currently preferred embodiment of the present invention.

Referring to FIG. 2 there is shown another embodiment of a passively mode-locked, high-power laser that has been built in accordance with the present invention. In this embodiment a main cavity 26 and an external cavity 28 are oriented in line with one another with a beam splitter 30 included to extract usable pulsed mode-locked output beam from the main cavity 26 along a path 32. As in the previous embodiment, the main cavity 26 includes a lasing medium 34, a fully reflective mirror 36 and an output coupler 38. The external cavity includes a return mirror 40 and an optical fiber 42 as the non-linear element. A pair of lenses 44 and 46 are disposed between the output coupler 38 and optical fiber 42 to correct for the divergence of the output beam from the main cavity 26 and to couple the beam into the optical fiber 42.

As in the previous embodiment, a fraction of each laser pulse is reflected back from the output coupler 38 and the remaining fraction of each pulse is transmitted through the coupler 38. The transmitted fraction of each pulse then passes through the optical beam splitter 30 and the collimating lenses 44 and 46 to the optical fiber 42. This transmitted fraction of the pulse then passes a first time through the optical fiber 42, reflects off of the mirror 40 and returns back through the optical fiber 42 a second time. A fraction of each pulse exiting the optical fiber 42 then passes back through the beam splitter 30 and the lenses 44 and 46 to interferometrically recombined at the output coupler 38 with the originally internally reflected portion of the pulse as it returns back to the output coupler 38. To provide interferometric recombination of the transmitted fraction of the pulse returning from the exterior cavity 28 with the reflected fraction of the original pulse that has made another round trip of the main cavity 26, the respective lengths of the exterior cavity 28 and main cavity 26 are configured so that the travel time of each portion of the original light pulse is approximately the same.

Figure 3:
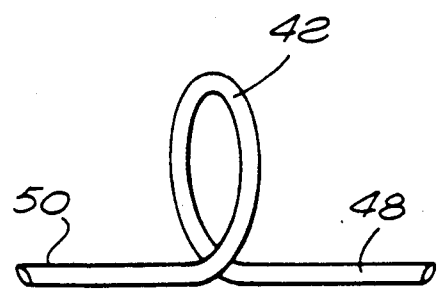
FIG. 3 illustrates the non-linear optical element employed in the preferred embodiment illustrated in FIG. 2.

As illustrated in FIG. 3, the ends 48 and 50 of the optical fiber 42 are preferably oriented at a non-perpendicular angle to the longitudinal axis of the optical fiber 42. Light pulses from the main cavity 26 are typically partially reflected off of the forward and rearward surfaces of the optical fiber ends 48 and 50. The non-perpendicular orientation of the optical fiber ends 48 and 50 avoids directing these partial reflections back into the main cavity. In one presently preferred embodiment the ends 48 and 50 of the optical fiber 42 form a three to ten degree angle to the perpendicular plane. In lasers employing a lasing medium having a long relaxation time, the inventors have also found it important to avoid these and other partial reflections in order to prevent apparent Q-switching in the main cavity, which would otherwise preclude mode-locking. Alternatively, reflections off of the ends 48 and 50 of the optical fiber 42 could be minimized by applying anti-reflective coatings to the optical fiber ends 48 and 50. Such coatings are known in the laser art.

In this embodiment, the return mirror 40 in the external cavity 28 is configured to act as a retro-reflector. Retro-reflectors typically have the characteristic of returning a light beam directly along the path of an incident beam. Light pulses exiting the rear surface 50 of the optical fiber 42 are highly divergent due to the small size of the optical fiber 42. By providing the mirror 40 with a concave reflective surface, the output from the rear surface 50 of the optical fiber 42 can be reflected directly along its incident path, thus maximizing the percentage of light coupled back into the optical fiber 42 and returned to the main cavity 26. The inventors have also found it preferable to employ a return mirror 40 spaced apart from the rear surface 50 of the optical fiber 42 in high power laser applications to avoid buring the end of the optical fiber 42 near the mirror 40.

In application, this approach has been found by the inventors to provide a CW passively mode-locked, high-power laser. A continuous train of mode-locked laser pulses of up to eight watts of average power have been obtained using this approach with a Nd:YLF lasing material. The pulses have a nearly transformed-limited shape and a duration as short as 3.7 picoseconds, indicating a substantial increase in the percentage of locked mode over the gain bandwidth of Nd:YLF. The peak power achieved is as high as 20 kW. While a variety of materials may be suitable to achieve non-linear phase shift in the laser pulses from the main cavity 26, the presently preferred embodiment of the current invention employs an optical fiber 42 as the non-linear element. Successful application of this passive external cavity approach to neodymium-doped lasers further indicates that the present invention is also applicable to any other homogeneously broadened lasing medium.

Referring to FIG. 4 there is shown an alternative embodiment of the present invention. In the previous embodiment illustrated in FIG. 2 the main cavity 26 and external cavity 28 were optically coupled by a beam splitter 30 disposed outside the main cavity 26. In the embodiment illustrated in FIG. 4, however, the external cavity 63 is optically coupled to the main cavity 65 by a beam splitter 52 disposed within the main cavity so as to effectively combine the cavities. Thus, in this embodiment a pair of fully reflective mirrors 54 and 56 are oriented toward and parallel one another so as to define an optical axis 58 in the main cavity. A suitable lasing medium 60 is also positioned along the optical axis 58 within the main cavity 65. Passive mode-locking is then achieved by reflecting a portion of the laser beam along the optical axis 58 off of the beam splitter 52 along a path 62 to a non-linear optical element, such as an optical fiber 64, and a return mirror 66. As in the previous embodiment, one or more lenses 67 are disposed between the beam splitter 52 and optical fiber 64 to correct for divergence in the fraction of the laser beam directed to the optical fiber 64 and to optimally couple the laser beam into the fiber 64. Additionally the mirror 66 is also preferably configured with a concave surface and positioned with respect to the optical fiber 64 so as to retro-reflect the output beam from the fiber 64. An output beam is obtained in this embodiment by providing a second beam splitter 68 along the optical axis 58 so as to deflect a fraction of the laser beam travelling between the mirrors 54 and 56 along an output path 70.

In this embodiment the percentage of the laser beam coupled into the optical fiber 64 can be varied by employing a polarization beam splitter 52 in conjunction with a wave-plate 72 such as a quarter wave-plate. Materials suitable for use as a polarization dependent beam splitter are well known in the optical art. Optical materials suitable for shifting the polarization angle of an incident coherent beam are similarly well known in the optical art. Applicants, however, consider the use of these materials in the system of the present invention to be new. To selectively couple coherent radiation by use of a beam splitter disposed either exterior to or within a laser resonant cavity by the use of a polarization beam splitter 68 and wave plate 74 is part of their invention. Rotation of the wave plate 72 thus varies the polarization of the laser beam along the optical axis 58 and the percentage of light reflected by the beam splitter into the optical fiber 64. The output power from this embodiment can also be varied by employing a similar set of polarization beam splitter 68 and wave-plate 74. The output power will then vary depending upon the orientation of the second wave-plate 74. This embodiment is particularly suited for further study of the effects upon the shape and duration of output pulses from the laser caused by varying the percentage of light passing through the optical fiber 64 and eventually exiting the laser along the path 70. The inventors have determined that the width of the laser pulses generated by this laser is dependent, among other parameters, upon the percentage of laser light coupled to the optical fiber 64.

Referring to FIG. 5, there is shown yet another embodiment of the present invention in which passive mode-locking is achieved by coupling a non-linear external cavity 85 with the main cavity 81 of the laser. As in the previous embodiment, an optical axis 73 is defined through a suitable high-power lasing medium 75 by a pair of fully reflective mirrors 76 and 78 oriented towards and parallel to one another. A fraction of the laser beam travelling along the optical axis 73 is then deflected with a beam splitter 80 toward a non-linear optical element such as an optical fiber 82, and a return mirror 84. One or more lenses 86 may also be included to correct for divergence of the laser beam entering the non-linear element 82. An output beam is derived in this embodiment by providing a second beam splitter 88 disposed between the first beam splitter 80 and the non-linear element 82 so as to deflect a fraction of the laser beam along a path 90. The percentage of the laser beam coupled into the non-linear element 82 and the output power of the laser can also be varied in this embodiment by use of polarization beam splitters 80 and 88 and by providing a first wave-plate 92 along the optical axis 72 and a second wave-plate 94 between the first and second polarization beam splitters 80 and 88.

The present invention thus provides a passively mode-locked laser which can employ a variety of lasing media having long relaxation times, narrow bandwidths or high-power outputs. This invention is suitable, for example, for mode-locking lasers employing neodymium-doped materials such as Nd:YLF and Nd:YAG. It is clear that modifications may be made to the presently-preferred embodiments discussed above without departing from the scope of the current invention. Thus, for example, long relaxation time laser media other than neodymium lasing materials could be employed. Lasing material such as optical fibers doped with a rare earth element, e.g., erbium or neodymium, could be therefore employed in the present invention. Similarly, the passive mode-locking scheme of the present invention could also be employed with lasing materials that have a narrow gain bandwidth or, as discussed above, lasing materials that are homogeneously broadened. Additionally, the mirrors of the laser main cavity could be positioned very close to the lasing material to achieve a very high repetition rate in the output of the laser. Other arrangements of the non-linear optical element with respect to the main cavity can also be readily developed. Accordingly, the scope of the present invention is not to be limited by the preferred embodiments discussed above, but only by the claims set forth below.

What is claimed is:

1. A passively mode-locked laser, comprising:
   a main cavity including a first mirror and a second mirror spaced apart from and oriented toward one another so as to form an optical axis;
   a lasing medium, disposed along said optical axis, having a long fluorescene relaxation time;
   exciter means for inducing a population inversion in the lasing medium and causing the main cavity alone to emit a continuous non mode-locked beam of coherent radiation;
   optical means, disposed to intercept and transmit a portion of the continuous, non mode-locked, coherent beam travelling along said optical axis, for inducing a phase shift in the transmitted beam;
   a third mirror positioned to reflect the beam transmitted through the optical means back into said optical means, with said first, second and third mirrors forming a coupled cavity wherein the laser is mode-locked and pulsed; and
   output coupling means for emitting the pulsed radiation from said coupled cavity.

2. The laser of claim 1 wherein said lasing media is a neodymium-doped material.

3. The laser of claim 1 wherein said lasing medium is Nd:YLF.

4. The laser of claim 1 wherein said lasing medium is Nd:YAG.

5. The laser of claim 1 wherein said lasing medium is an optical fiber doped with an active element selected from the group consisting of Nd:YAG and Nd:YLF.

6. The laser of claim 1 wherein the non-linear optical means is an optical fiber.

7. The laser of claim 6 wherein opposing ends of the optical fiber from a non-perpendicular plane to a longitudinal axis of the optical fiber and wherein Q-switching is avoided.

8. The laser of claim 6 wherein said third mirror is spaced apart from an end of said optical fiber and is configured as a retro-reflector such that damage to said fiber end is avoided.

9. The laser of claim 1 wherein said output coupling means includes a beam splitter having a reflectance dependent upon a polarization orientation of an incident laser beam on the beam splitter and further comprising optical means for varying the polarization orientation of the incident laser beam, wherein the percentage of coupling into the optical means is variable.

10. The laser of claim 9 further comprising:
    a second beam splitter, disposed within the main cavity, having a reflectance dependent upon a polarization orientation of an incident laser beam on said second beam splitter; and
    a second optical means, disposed adjacent said second beam splitter, for varying the polarization orientation of the incident laser beam, wherein the output power of the laser may be varied.

11. A passively mode-locked laser, comprising:
    a main cavity formed by a first and a second mirror and including a lasing medium having a narrow gain bandwidth and exciter means for inducing a population inversion in the lasing medium and causing the main cavity alone to emit a continuous non mode-locked beam of coherent radiation;
    an external cavity, disposed to intercept the coherent beam from the main cavity, including optical means for passively inducing a phase shift in the coherent beam from the main cavity and re-injecting a phase-shifted coherent beam beam back into the main cavity, wherein the laser is mode-locked and pulsed; and
    output coupling means for emitting the pulsed radiation from the laser.

12. The laser of claim 11 wherein said lasing media is a neodymium-doped material.

13. A passively mode-locked laser, comprising:

a main cavity formed by a first and a second mirror and including a lasing medium having a neodymium-doped material and exciter means for inducing a population inversion in the lasing medium and causing the main cavity alone to emit a continuous non mode-locked beam of coherent radiation;

an external cavity, disposed to intercept the coherent beam from the main cavity, including optical means for passively inducing a phase shift in the coherent beam from the main cavity and re-injecting a phase shifted coherent beam back into the main cavity, wherein the laser is mode-locked and pulsed; and output coupling means for emitting the pulsed coherent radiation from the laser.

14. A passively mode-locked laser, comprising:

a main cavity formed by a first and a second mirror and including a homogeneously broadened lasing medium and exciter means for inducing a population inversion in the lasing medium and causing the main cavity alone to emit a continuous non mode-locked beam of coherent radiation;

an external cavity, disposed to intercept the coherent beam from the main cavity, including optical means for passively inducing a phase shift in the coherent beam from the main cavity and re-injecting a phase-shifted coherent beam back into the main cavity, wherein the laser is mode-locked and pulsed; and output coupling means for emitting pulsed radiation from the laser.

15. The laser of claim 14 wherein said lasing medium is a neodymium doped material.

* * * * *